(12) United States Patent  
Matsler (10) Patent No.: US 9,272,569 B2  
(45) Date of Patent: Mar. 1, 2016

(54) WHEEL LUG RING

(71) Applicant: Craig McClain Matsler, Creswell, OR (US)

(72) Inventor: Craig McClain Matsler, Creswell, OR (US)

( * ) Notice: Subject to any disclaimer, the term of this patent is extended or adjusted under 35 U.S.C. 154(b) by 0 days.

(21) Appl. No.: 14/543,505

(22) Filed: Nov. 17, 2014

(65) Prior Publication Data

US 2015/0069824 A1    Mar. 12, 2015

Related U.S. Application Data

(63) Continuation-in-part of application No. 13/065,712, filed on Mar. 29, 2011, now abandoned.

(51) Int. Cl.
*B60B 7/08* (2006.01)
*B60B 7/06* (2006.01)
*B60B 7/02* (2006.01)

(52) U.S. Cl.
CPC . *B60B 7/068* (2013.01); *B60B 7/02* (2013.01); *B60B 2900/141* (2013.01); *B60B 2900/211* (2013.01); *B60B 2900/572* (2013.01); *Y10T 29/49826* (2015.01)

(58) Field of Classification Search
CPC .... B60B 7/068; B60B 7/02; B60B 2900/141; B60B 2900/211; B60B 2900/572
USPC ............. 301/37.372, 37.373, 37.374, 37.376, 301/108.1
See application file for complete search history.

(56) References Cited

U.S. PATENT DOCUMENTS 5,052,758  A  * 10/1991  Patti et al. .................. 301/108.4
5,297,854  A  *  3/1994  Nielsen et al. ........... 301/37.373
7,467,829  B2 * 12/2008  Wright et al. .............. 301/108.1
2004/0181924 A1*  9/2004  Saunders et al. ............. 29/426.5

* cited by examiner

*Primary Examiner* — Jason S Morrow
*Assistant Examiner* — E Turner Hicks
(74) *Attorney, Agent, or Firm* — Donn K. Harms (57) ABSTRACT

A wheel lug ring is provided having an annular body with a cavity formed on one side having a plurality of lug wells in a registered positioning to engage around a plurality of lug nuts holding a wheel to an axle. So positioned, the device forms a protective cavity for the lug nuts and lugs from moisture, ice, mud, and other road hazards.

6 Claims, 7 Drawing Sheets

FIG. 1

FIG. 2 Section View

WHEEL LUG RING

This application is a Continuation-in-Part application of U.S. patent application Ser. No. 13/065,712 filed on Mar. 29, 2011 which is included herein in its entirety by this reference, thereto.

FIELD OF THE INVENTION

This invention relates generally to a covering device for a vehicle's wheel and more specifically to a protective and decorative cover for lug nuts and wheel studs on a vehicle's wheels. Similar devices can be deployed on any vehicle that uses a wheel stud and lug nut to secure the wheel and tire to a vehicle as long as the lug nuts and wheel studs are exposed for attaching the covering device.

BACKGROUND

A lug nut is a fastener, specifically a nut, used to secure a wheel on a vehicle. Typically, lug nuts are found on automobiles, trucks, and other large vehicles utilizing rubber tires. Stud and nuts are used to secure wheels and tires to a vehicle allowing easy removal for replacement or repair of a tire due to wear and tear. A typical lug nut can be described as being a nut with a threaded interior and a hexagonal shaped exterior and sometimes with a rounded or conical (tapered) end exterior, the latter being used for aesthetic reasons. Lug nuts are used on steel and most aluminum style wheels. One or more lug nuts are used to secure a wheel to a threaded wheel stud to a vehicle's axles. Generally, wheel studs are semi-permanently mounted directly to the vehicle brake drum or disc hub in a circular pattern. The studs extend axially away from the drum or hub. A wheel and tire are placed over the studs with the lug nut securing the wheel and tire to the vehicle. Besides securing the wheel to the vehicle, many lug nuts have been designed and manufactured to provide a pleasant view of the tire. Wheel coverings can come in many types of alloys and finishes, but the preferred finish is a chrome or polished steel facade.

Due to the number, detail, and type of finish on lug nuts, there are increasingly more products and devices dedicated for the cleaning and polishing of the lug nut and wheel area. There are many chemical cleaners on the market to remove road grime, dust and oils. The chemical cleaners usually tout their ability to remove the various types of road dirt while ensuring the wheel covering and lug nut are not chemically corroded, pitted or damaged by use of chemical cleaners. Additionally, there are many types of devices that are used for cleaning the area around the stud and lug nut, including: U.S. Pat. No. 458,425, Wheel and Lug Nut Cleaning Tool, issued to Large (June 2002) disclosing an ornamental design for a wheel and lug nut cleaning tool. Utility patents have been issued for the same purpose, including; U.S. Pat. No. 6,754,932, Lug nut and hub cap and rim receptacle cleaning device, issued to Buzard (issued June 2004), disclosing a tool or device used for cleaning vehicular lug nuts or lug nut covers and the surfaces of lug nut or lug nut cover receiving receptacles of hub caps or rims.

In addition to patented items for this purpose, there are many commercial items on the market that accomplish the task of cleaning wheel studs and lug nuts. The number and type of decorative wheel coverings has increased as well with truck operators wanting to improve the appearance of their trucks and trailers. The market for the various types of decorative wheel covers has increased greatly over the last twenty years. Several of the patented items for wheel covers include, U.S. Pat. No. 5,286,092 issued to Maxwell (issue date February 2004) which discloses a decorative wheel cover for the wheel of a truck.

U.S. Pat. No. 5,842,749 issued to DiMarco (issue date December 1998) which discloses a covered lug retention assembly for a wheel cover. U.S. Pat. No. 6,135,570 issued to Wieczorek (issue date October 2000) which discloses a wheel cover having a one-way locking mechanism and decorative nut cap. There are many other patents, both utility and design patents, which disclose decorative, wheel covers.

Another aspect of the wheel cover is the utility in protecting the lug nut and wheel stud from road dirt and grime and corrosion from water and salt, and in many climates, freezing. Many of the decorative wheel cover patents include the utility of preventing road dirt and grime from contacting the threads and contact point of the lug nut and wheel studs. Grime, dirt, moisture and other road material that is able to contact and penetrate the openings and pathways communicating with the threaded studs engaging the lug nut can cause corrosion and weakening of the securing capability of the lug nut. U.S. Pat. No. 6,273,658 issued to Patterson et al. discloses a device that covers the lug nut and wheel stud in a casing that has grease or some similar type water resistant material within.

As such, there is an unmet need for a decorative wheel cover that provides protection for the wheel stud and lug nuts from corrosion, road dirt, grime and moisture. Such a device should be configured to securely mount on the different lug nut spacings of different wheels using the same component for both. Such a device should be configured for a secure frictional engagement thereon, but also provide for easy removal when access to the underlying lugs and lug nuts is desired.

Additionally desirable is a configuration of such a lug protective and ornamental cover which is also easy to clean and provides the user with a pleasant ornamental appearance.

Additionally, such a lug cover should be easily engageable to a secure engagement due to the high rotation speed of the wheels to which it mounts, yet should also allow the user to quickly remove it from such a mount should the user be required to replace worn or flattened tires. The covering should be able to stay on a vehicle tire under normal and extreme conditions a typical tire could experience. Lug nut covers mentioned in the prior art fall short of one or two of the ideal cover while this invention provides a cover that will be readily and easily cleaned, easy to put on and take off, and provides for the protection of the lug nut and wheel stud from corrosion, dirt and grime.

With respect to the above, before explaining at least one preferred embodiment of the wheel cover providing corrosion protection to multiple sized and spaced lug device in detail or in general, it is to be understood that the invention is not limited in its application to the details of employment and to the arrangement of the components or the steps set forth in the following description or illustrated in the drawings. The various apparatus and methods of the herein disclosed invention are capable of other embodiments, and of being practiced and carried out in various ways, all of which will be obvious to those skilled in the art once the information herein is reviewed.

Also, it is to be understood that the phraseology and terminology employed herein are for the purpose of description and should not be regarded as limiting. As such, those skilled in the art will appreciate that the conception upon which this disclosure is based may readily be utilized as a basis for other wheel lug covers capable of multiple engagements on differing lug and nut sizes. It is important, therefore, that the embodiments, objects and claims herein, be regarded as including such equivalent construction and methodology insofar as they do not depart from the spirit and scope of the present invention.

SUMMARY OF THE INVENTION

The improved lug nut cover or lug ring herein described and disclosed is a circular donut-shaped body which is secured to the exterior of the wheel and tire assembly of vehicles which engage such wheels to vehicle axles using wheel studs and cooperatively engaging lug nuts. The lug ring is place directly over the wheel studs and lug nuts with the lug ring body is configured with a plurality of lug wells on a first or back side which are sized and spaced to operatively engage upon the exterior of the lug nuts which are cooperatively engaged to the wheel studs which hold the wheel to the vehicle axle.

The cylindrical recesses defining the lug wells are manufactured and sized such that the lug wells frictionally engage upon the surface of one or more of the lug nuts engaged to the studs. The body forming the lug ring is sufficiently elastic to form a biased frictional engagement with the exterior surface of an inserted lug nut. This frictional engagement is provided to the body and the recesses extending from the lug ring through the employment of a polymeric material such as high impact plastics such as Polycarbonate (PC, or polypropylene, or polyethylene, or another polymeric material to at least form the wall extending from the body which form the for the sides of the lug wells.

The diameter of the cylindrical recesses is such that the inner wall surface communicates against and then engages in a slightly biased or compressed engagement between the wall of the recess and the exterior of the lug nut. Such lug nuts are typically made of hard steel or a similar metal alloy and will frictionally engage with the cylindrical recess wall when the recesses extending from the body of the lug ring, are aligned, and pressed onto, and translated upon the lug nuts.

The lug wells are dimensioned such that the lug nut is constricted in the lug well recess by a frictional and in most cases a biased frictional engagement thereto. The tight engagement thus requires the use of a pry type component to remove the lug nut cover from its as-used engagement with a wheel when such a removal is required.

The exterior surface of the lug nut cover body is typically convex or rounded and forms a U-shaped opposite side from which the recesses defining the lug wells extend. The exterior surface of the body of the lug nut cover can be polished metal or alloy, like chrome, or a colored hard plastic that reflects that color onto the surfaces of highly polished metal finishes used on most wheels.

While the preferred embodiment of the lug ring deploys a polymeric high density plastic on the first or interior side of the body of the lug ring, the exterior can be made from either a hard plastic, hard metal, or a type of alloy from which the wheel is made—aluminum or similar metal. The lug ring body can be a unitary structure formed by molding a single material or can be made from multiple layers that allow the lug well to compress over or fit snugly onto the lug nut. Materials that do not form a biased frictional or compressible engagement of the walls of the lug wells on the lug nuts may still be used with the addition of means for attaching the lug ring to the lug nut, such as clips or magnets.

The disclosed device may be formed to be used on any type of open lug wheel. In some modes the lug wells formed by the extending walls from the body defining recesses, can be spaced to allow engagement of the same device upon multiple sized lugs, such as either metric sized lug nuts or standard sized which are also positioned in differing spaced arrangements in their extension from the vehicle axle. The disclosed device is particularly well adapted for employment on large recreational vehicles or on commercial vehicles, like trucks which have hub piloted wheels or lug piloted wheels.

It is an object of this invention is to provide a wheel lug cover configured to allow a single such cover to engage either upon U.S. standard or metric lug nuts.

Another object of the invention is to provide such a wheel lug cover which is configured to seal out water, particulate, and other corrosive elements from communication with the underlying lug nuts or lugs.

Yet another object of the invention is to provide such a protective wheel lug cover which is adapted for engagement on a first surface with the lug nuts holding a wheel to an axle, and on the second or opposite surface, to provide an ornamentally pleasing appearance in the as-used position engaged to the wheel.

The foregoing has outlined some of the more pertinent objects of the invention provided by the apparatus and system herein. These objects should be construed to be merely illustrative of some of the more prominent features and applications of the intended invention. Many other beneficial results can be attained by applying the disclosed system and apparatus in a different manner or by modifying the invention within the scope of the disclosure.

Accordingly, other objects and a fuller understanding of the invention may be had by referring to the summary of the invention and the detailed description of the preferred embodiment in addition to the scope of the invention defined by the claims taken in conjunction with the accompanying drawings.

DETAILED DESCRIPTION OF THE INVENTION

Figure 1:
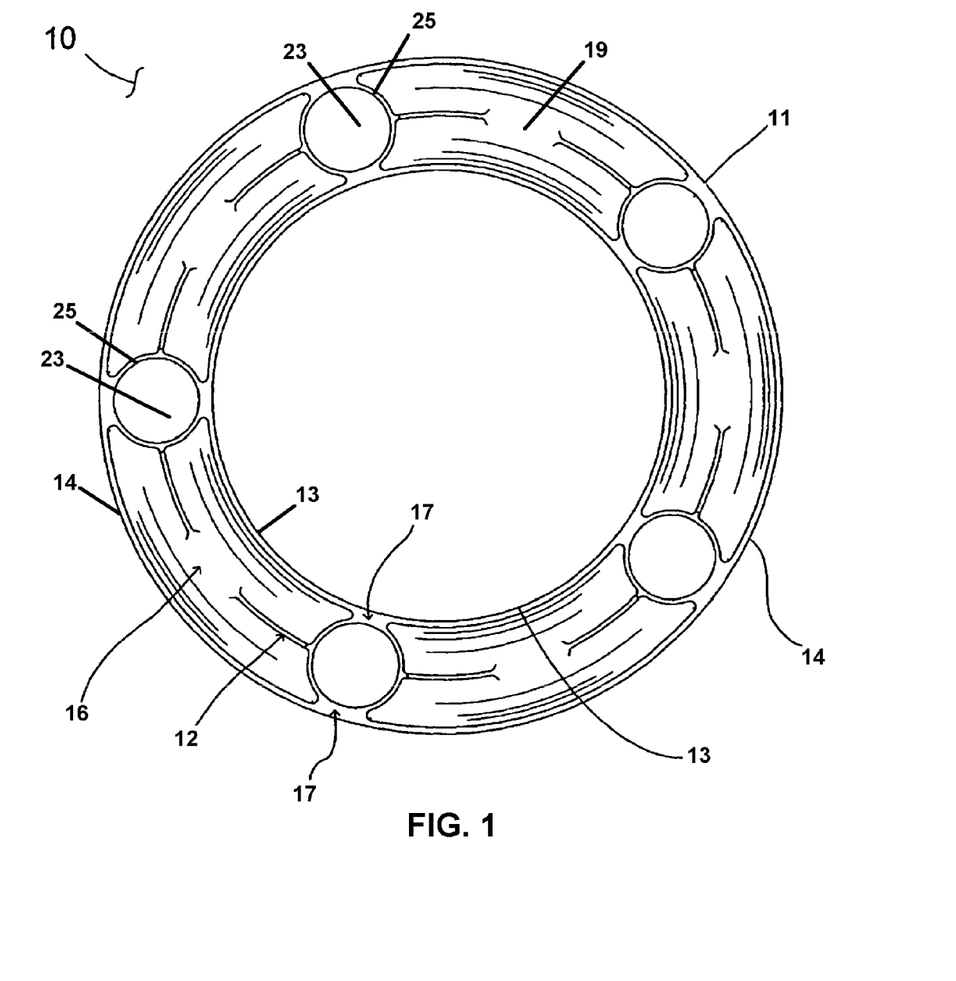
FIG. 1 is a bottom view of the first side of the annular body defining the lug ring showing the concave cavity having five lug wells engaged and arranged radially around the lug ring.
Figure 2:
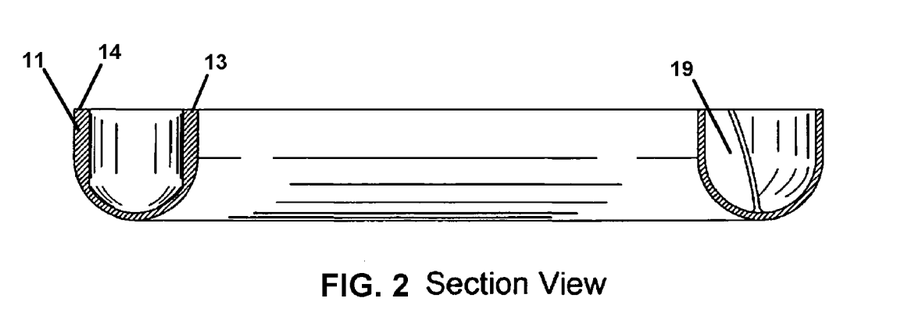
FIG. 2 is a cross sectional view of the body of the lug ring.
Figure 3:
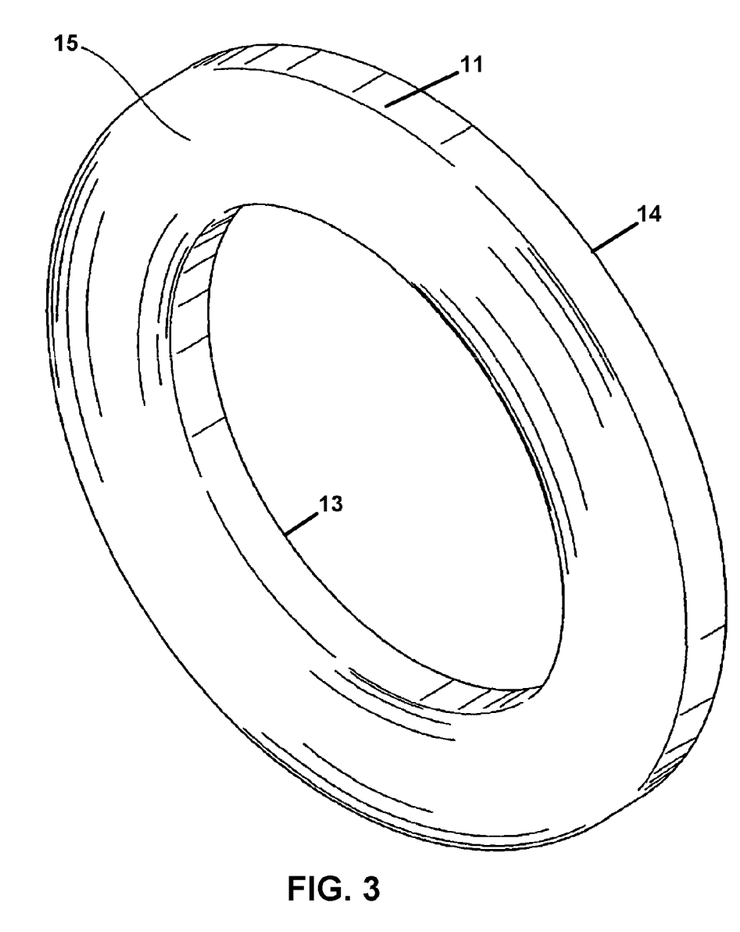
FIG. 3 a perspective of the top or second side of the sidewall defining the annular body of the lug ring.

Referring now to FIGS. 1-14 herein, wherein similar components are identified by the same numerals, there can be seen in one favored mode in FIGS. 1 and 3, the lug ring 10 has an annular body 11 formed is a circular ring-like shape. The body 11 is formed having a convex second or exterior side 15 which is typically curved or rounded and is exposed when placed on a vehicle's wheel. The first or interior side 16 of the body 11, is adapted to face toward the wheel when the lug ring 10 is in an as-used position, attached to the lug nuts of a wheel. The body 11 wall defining the exterior also defines a generally U-shaped or concave cavity defined by the first side surface extending between an outer diameter edge 14 and an interior inner diameter 13 edge.

One or preferably a plurality of lug wells 23, are positioned radially around the concave first side of the lug ring body 11. The lug wells are a built up structure in which the lug nut and studs are inserted to secure the lug ring to the wheel to the as used position. The lug wells sit or project from the cavity 19 or well of the concave first side of body 11 of the lug ring and project no farther than the outer diameter edge 14 and inner diameter edge 13, for a flush or flat plane on the concave first side of the body 11 of the lug ring. A reinforcement webbing 12 projects axially out of surface of the concave portion of the lug ring body 11 and provide some stability to the lug wells.

The lug wells stability 23 is enhanced by attaching the lug wells 23 directly to an inner wall by support arms 17 of the concave interior side of the lug ring 10. The lug wells are generally a hollowed out cavity dimensioned and adapted for placing onto and over a circumference edge 41 extending around the intersection points of the planar side surfaces of a lug nut 35 which is engaged on a lug or stud (not shown) to hold a wheel to an axle.

Figures 9, 10, 11, 12, 13, 14:
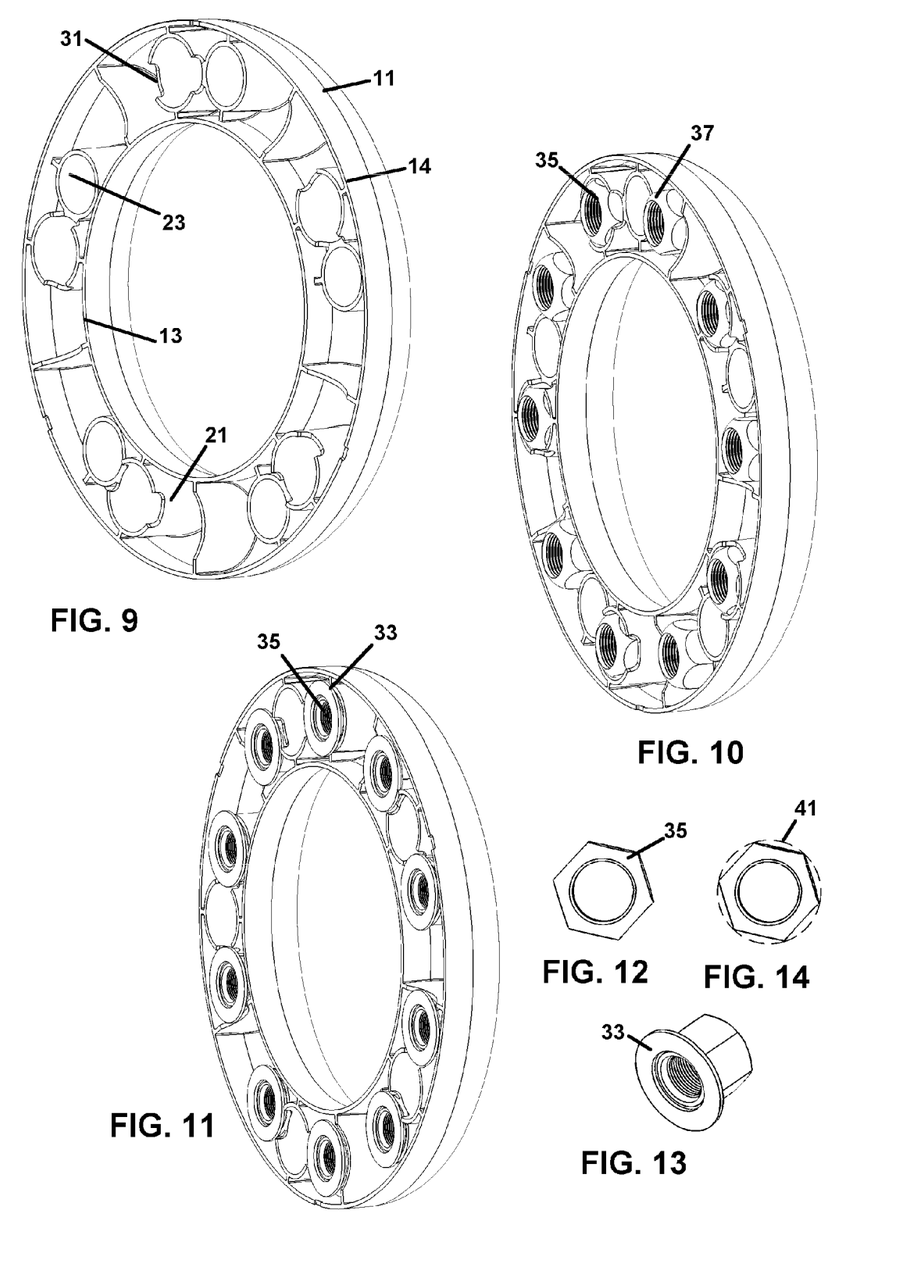
FIG. 9 depicts the device of FIGS. 7-8 in a different perspective view shown the radially spaced pairs of lug wells forming two sets of lug wells in respective differing radial spacings.
FIG. 10 shows the device of FIG. 9, showing a first set of spaced lug wells, each a member of a respective pair thereof, frictionally engaged upon a first set of lug nuts typical of lug-piloted wheels.
FIG. 11 shows the device of FIG. 9 having the second set of spaced lug wells where each is a member of positioned pairs, engaged upon a second set of lug nuts of a different circumference configuration from the first set of lug nuts typical of hub-piloted wheels.
FIG. 12 shows a typical lug nut employed on lug-piloted wheels the lug wells herein are adapted to engage.
FIG. 13 depicts a typical lug nut employed on hub-piloted wheels the lug wells herein are adapted to engage.
FIG. 14 shows the circumferential edge of a lug nut extending around the intersection points of the angled sides.

The lug wells 23 defined by recesses positioned in a lug wall 21 extending within a cavity 19 formed by the sidewall 25 defining the body 11 on the first side thereof, and are placed radially around the body 11 with reinforcement webbing 12 such that the wells 23 are formed in a spaced set, where each lug well 23 is in a registered position to align with and adapt to engage respective lug nuts 35 which are engaged to lugs or studs in an identical spacing, which project from the surface of a wheel to hold it to an axle. The number, shapes and sizes and radial spacing of the lug wells 23 will depend on the type of wheel, studs and lug nuts the lug ring 10 is configured to engage in the as-used position. Typically, the diameter of the interior of the lug well will correspond with the circumferential edge 41 extending around the lug nut, which as shown in FIGS. 12-14, is generally hexagonal. The interior or first side of the body 11 of the lug ring will attach or be placed in substantially sealed contact with the exterior side surface of a wheel, where the wheel studs communicate through the wheel surface and lug nuts are exposed.

Typically, a hub is situated within the middle of the vehicle's wheel and protrudes out and away from the wheel. The lug nuts 35 and wheel studs are generally evenly radially displaced around the hub in a circular design. In the center of the lug ring, the interior inner diameter edge 13 is sized to fit over and around the hub and is dimensioned accordingly depending on the size of the wheel and hub.

In use, to place the lug ring 10 onto the lug nuts to position the device 10 to an as-used position on the wheel, the user aligns the lug ring 10 such that the lug wells 23 align to respective the lug nuts engaged to lugs holding the wheel. When the lug ring is aligned such that the lug nuts are in line with the lug wells 23, the body 11 of the lug ring device 10 is pressed onto a frictional engagement of the lug wells 23 with the circumferential edge of the lug nuts by the user. The lug well device 10 has a body 11 sized to fit over the annular pattern of the circumference of any standard commercial lug nuts and lugs, and the user will need to ensure that the lug wells is sized to accept a frictional engagement of the circumference of the lug nut in such a manner that the lug ring device 10 is not loose when the lug nuts are engaged within respective radially spaced lug wells.

Figure 4:
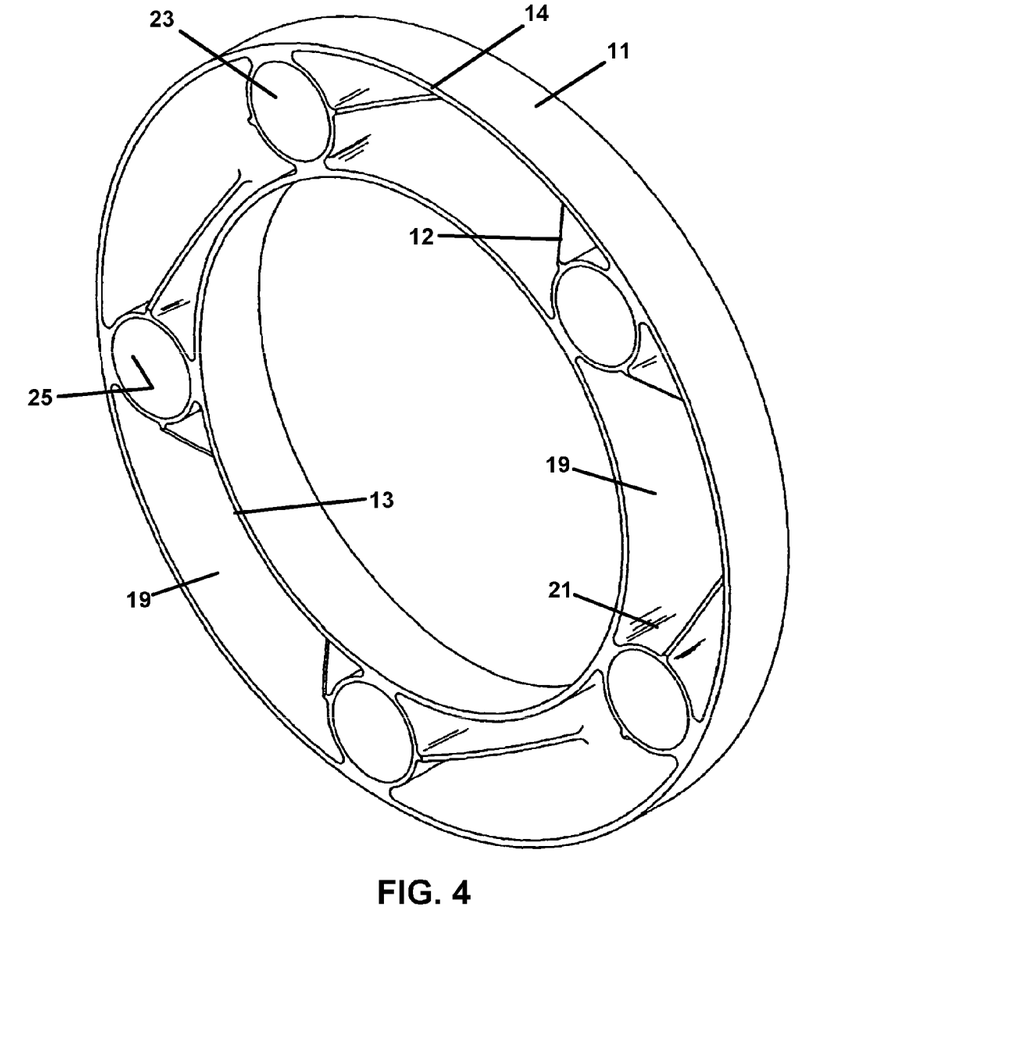
FIG. 4 is a perspective view of the bottom or first side of the body of the lug ring.

Referring now to FIG. 4, the interior of the lug wells 23 is dimensioned with a diameter to accept a standard hexagonal shaped lug nut, with the size of the interior dimensions made to ensure a tight fit at the circumference points of the hexagonal shaped nut when the lug nut is positioned within the lug well 23. When the body 11 and engaged lug wells 23 are pressed onto the hard metal hexagonal shaped lug nuts, the circumferential points of the hexagonal nuts press or deflect into the hard plastic or similar material defining the lug wells 23 making for a tight fit or frictional engagement thereof. In the preferred embodiment, the frictional engagement of the lug wells 23 of the body 11 onto the lug nuts, is similar to a compression fitting in that the compression into the lug well sidewall 25, prevents the lug ring from coming off the lug nut, until the body 11 of the lug ring is pried to slide the lug wells 23 from the lug nuts, using a pry type device that applies force perpendicular to the compression force of the lug wall 25.

In a preferred mode of the invention, the sizing and depth of the lug wells 23 will have a zero tolerance diameter or one that is equal to or preferable slightly smaller than the circumference extending around the lug nuts 34, (FIG. 4) which will cause a stretching of the wall of the lug well 23 during the act of engagement to an as-used position. This allows the user to engage the device 10 where the elastic nature of the lug wall 21 defining the lug well 23 will contract and form a compressive frictional engagement of the lug wells 23 onto and around the circumference edges of the aligned lug nuts 35, and allow the edges of the body 11 at the interior inner 13 and interior outer 14 edges, to contact and form a near seamless communication against the surface of the wheel which surrounds the lug nuts holding the wheel to the axle.

So engaged, the body 11 will form a sealed cavity 19 for the lugs and lug nuts 35 positioned within the cavity 19, as a means for preventing exposure to natural elements which would otherwise penetrate to the lug wells and lug nuts which causes corrosion. Additionally, the seamless rounded or curved surface of the exterior of the body 11 of the lug ring allow for easier cleaning of the wheel area.

In one preferred mode of the device, the reinforcement webbing 12 and the polymeric material from which the lug wells 23 are formed such as polycarbonate (PC) material, provide the benefits of impact toughness, dimensional stability, and heat and chemical resistance. Of course other polymeric materials may be employed, so long as they have the properties noted and ultra violet light resistance and resistance to many solvents.

When the lug ring device 10 has its body 11 positioned with the lug wells 23 aligned in a respective set, with the spaced lug nuts 35, and the diameter of the gap between the lug wall 21 defining the lug wells 23 being zero tolerance or substantially equal to or slightly larger than the circumference 41 extending around the lug nuts, a slightly elastic polymeric material will allow the lug well 23 to contract and to conform to the hard metal surfaces of the exterior lug nut 35 as the lug wells 23 translate thereon during installation to the as-used position.

This equal or slightly smaller diameter of the lug wells 23 to the diameter of the circumference 41 of the lug nuts 35 yields a slight inward bias or compressive frictional engagement which provides a means to ensure the lug ring 10 remains engaged to the wheel and does not dismount during normal use of the vehicle. Employing the polymeric material with the toughness and slightly elastic nature herein, the lug ring 10 can be removed and replaced repeatedly without reducing the ability of the lug wells 23 to form a compression biased engagement around the exterior of a lug nut.

In all modes of the lug ring 10 device herein, an advantage of using the elastic polymeric material and obtaining a compression type biased fit to the as-used engagement to the wheel and engaged with the lug nuts, is to provide the noted protection from the natural elements and thereby minimizing the threaded wheel stud and lug nut from rust and corrosion and in some cases freezing. By minimizing the exposure of the threads from being exposed to dirt, grime, moisture and corrosive substances will ensure that the lug nuts are able to perform their primary function of fastening the tire and wheel onto the truck, trailer or vehicle.

In the preferred embodiment, the number of lug wells 23 employed for compressive frictional engagement to the lug nuts is three or more. Fewer than three lug wells 23 equidistant around a center point within the inner edge 13 used to fasten to the lug nuts 35 may not ensure a tight or snug fit upon the lug nuts 35 in sufficiently spaced points around the circular body 11 to maintain balance of the wheel when spinning and engagement of the device 10. The user can manually check the tightness of the fit by trying to rotate or dismount the device by hand once the lug ring 10 has been pressed onto the lug nuts and engaged to the as-used position. The user should not be able to move the device or rotate the body 11 once the lug ring has been properly placed onto the lug nuts.

The depth of the lug wells 23, shown for instance in FIGS. 2 and 5-11 can vary depending on the projecting length of the wheel stud and lug nut 35 from the engaged wheel. In some cases a single body 11 of the device, can accommodate numerous different vehicles by extending the axial length of the lug wells 23 to accommodate the longest projecting lug and lug nut since the body 11 will still engage shorter versions of such. The lug wells 23 as noted may also be adapted in spacing, to form a set of a plurality of lug wells 23, spaced to match a plurality of spaced lugs and lug nuts from an axle. Standard wheel lugs and lug nuts common to trucks and other commercial vehicles will provide the dimension and shape for the lug ring's lug wells. This does not limit the scope of the invention and it should be understood that the concept for the lug ring is meant to cover any wheel that has one or more exposed wheel stud and lug nut.

The exterior surface 15 of the body 11 of the lug ring 10 can be made from a number of materials and many finishes can be used depending upon the appearance the user would like to obtain. In the preferred embodiment, the convex exterior of the body 11 of the lug ring 10 will be rounded or curved so as to provide the U-shaped or convex opposing first side. Other shapes or dimension can be used depending on the desired appearance of the wheel and tire by the user. The rounded or curved exterior offers a sleek aero-dynamic look that can be easily cleaned.

The curved exterior will have a sealing edge formed along the interior inner 13 and outer diameter edges of the body 11 of the lug ring 10. As noted, this seal against the surface of the wheel being held by the lug nuts, defines a sealed cavity 19 when in the as-used position and a means to prevent communication of water, dirt, and grime, to the lug nuts and the lugs when the device is in the as-used position. The smooth surface of the rounded lug ring is easily cleaned with a wide range of cleaning solutions or just plain soap and water. The lack of angular surfaces that are exposed on a typical decorative lug nut reduces the amount of time a vehicle owner or operator will need to clean the wheel area.

In other preferred modes of the disclosed device, the interior of the body 11 of the lug ring 10 may be formed from alloys and materials other than polymeric material. Softer alloys, such as tin or aluminum, can be stamped out to reproduce the same shape and dimensions as the lug ring described above. Instead of using a compression fit to attach the lug nut to the lug well, the lug nut would have clips or magnets attached within the lug wells to secure the lug nut to the lug ring. Various means such as clips and magnets for attaching hub caps are known to those skilled in the art and the limited description provided for the alternative embodiment does not in any way limit the scope of the claims and is to be read in the most broadly accepted interpretation of the claims made in this application.

Another feature with the disclosed device in all modes, is the various color schemes that can be formed on the exterior of the body 11 of the lug ring 10 which will subsequently have the effect of various colors and reflections from the surrounding wheel and rim of highly polished chrome. Further, the device can employ an exterior surface of the body 11 which is adapted for the application of paint to the body of the lug ring in order to match a vehicle color. By using color on the exterior of the lug ring within a highly finished metallic rim, the color is reflected within the wheel and the tire and rims take on the color of the lug ring exterior. The effect is dramatic and is visually pleasing to those observing the lug ring on a vehicle.

Figure 5:
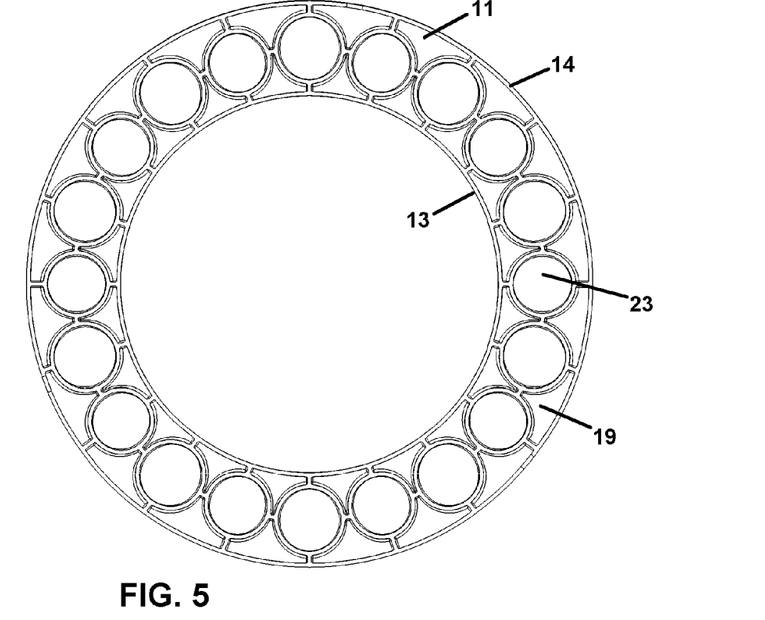
FIG. 5 depicts another mode of the device herein wherein the recesses defining the lug wells are configured in size and number and in registered positioning to engage multiple wheels having differing spacing and differing lug nut circumference sizes.

FIG. 5 depicts another mode of the lug ring 10 device herein wherein the recesses extending within the sidewalls 25 forming the lug wells 23, may be configured in size and number to engage multiple wheels, where each has differing spacing for the securing lugs and lug nuts, and/or may have differing lug nut exterior circumference sizes. Shown in FIG. 5 with a plurality of lug wells 23 spaced adjacent to the larger circumferential edge of the body 11, the lug wells 23 may be formed in sets which are spaced in a manner to match the annular spacing of the lugs and lug nuts which project through a wheel.

Figure 6:
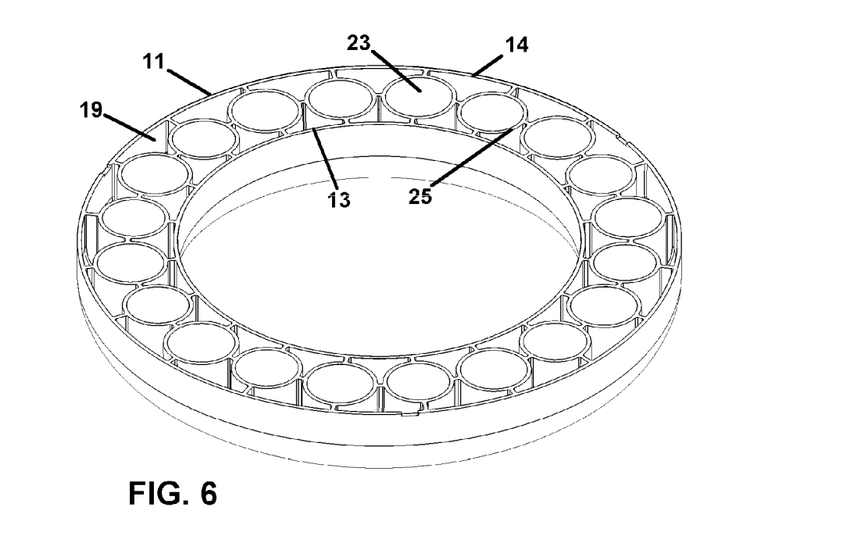
FIG. 6 is a perspective view of the device of FIG. 5.

As can be seen in both FIG. 5 and FIG. 6 which is a perspective view of the device of FIG. 5, the number in the plurality can serve to provide numerous different sized sets of lug nuts in numerous spacings. The interior area of the lug wells 23, in each spaced set, would be sized to achieve the frictional or compressive frictional engagement with each identically spaced lugs and lug nuts with which the set of lug wells 23 aligns for mounting. Thus, a single body 11 may have two or three or more spaced sets of lug wells 23 adapted in both spacing and circumference, to allow the body 11 to engage multiple wheels.

Figure 7:
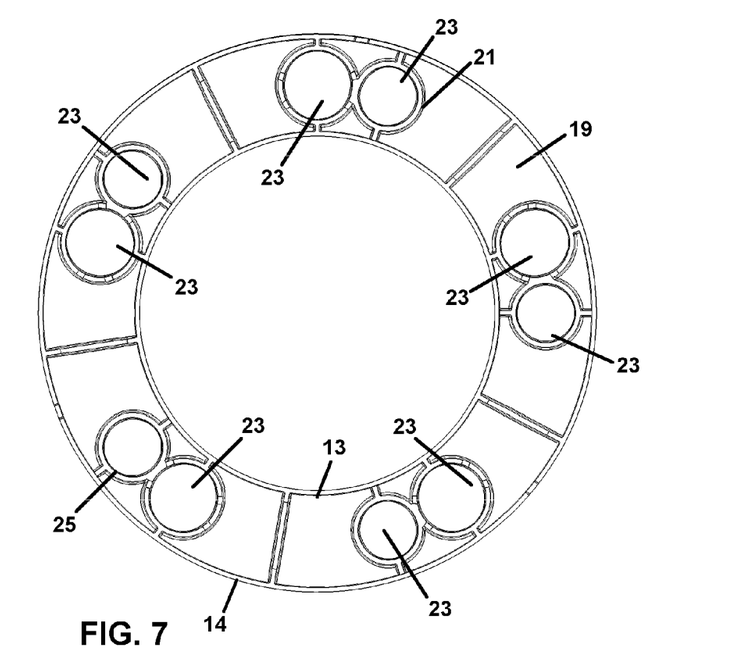
FIG. 7 depicts a mode of the lug cover device herein, having a plurality of sets of spaced recesses defining lug wells in pairs, wherein one in each pair have sizes and spacing to engage upon different respective wheels having differently sized and spaced groups of lug nuts.

FIG. 7 depicts a mode of the lug cover 10 device herein, illustrating a body 11 having a plurality of two sets, of lug wells 23, with each set positioned to align the lug wells 23 in that set, with a different set of projecting lugs and lug nuts which project a wheel in a spaced circular array. Thus one set of lug wells 23 can be sized and spaced in a circular pattern, to match the spacing and sizes of a first array of lugs having engaged lug nuts, and the other may be sized and spaced to fit a second circular array of lugs and engaged lug nuts.

Figure 8:
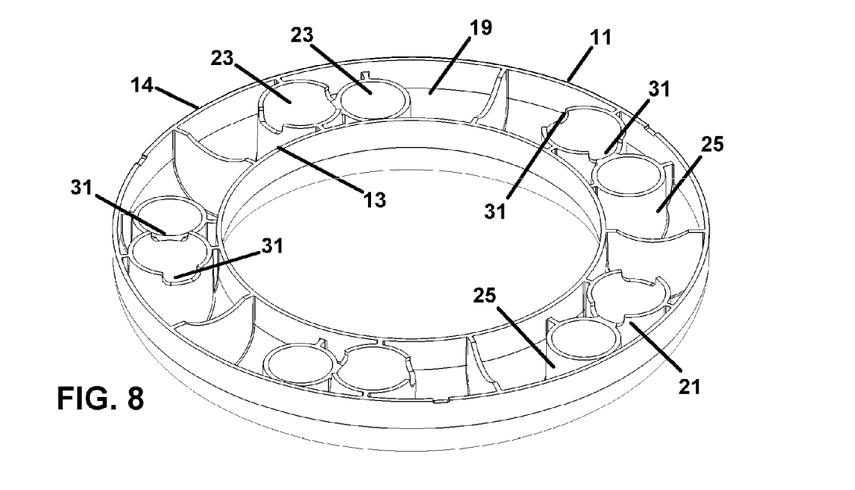
FIG. 8 shows a perspective view of the device of FIG. 7 and shows formed notches in the wall defining the recesses of one set of lug wells in the spaced pairs.

In FIGS. 8-9, is shown a view of a particularly favored mode of the device of FIG. 7 wherein formed notches 31 are positioned in the distal ends of the sidewall 25 defining the recesses determining the diameter of one set of lug wells 23. These notches 31 have a width which is configured to allow an annular shoulder 33, which projects from many conventional lug nuts 35, at their communication against the wheel when tightened on the threaded lugs. Thus, the device as depicted in FIGS. 7-9 is especially well adapted with two different sets of lug wells 23 spaced in pairs in respective circular patterns, where they register with and match identically spaced lug nuts. A first of the two sets will accommodate lug nuts 35 with annular shoulders 33, and a second of the two sets accommodates a set of lug nuts without shoulders.

This plurality of sets of lug wells 23 spaced and dimensioned to engage matching sets of projecting lugs and lug nuts, can also be seen in engaged modes in FIGS. 10-11 where the two different sets of lug nuts, while not part of the invention, are depicted in different circular spacings which match the spacing of respective sets of lug wells 23.

FIG. 9 depicts the device of FIGS. 7-8 in a different perspective view and shows the two sets of lug wells in respective differing spacings and positioned in pairs with one member sized for one type of lug nut and the adjacent member of each pair sized for another sized lug nut which has a rotating washer or annular ring or shoulder 33 at its base as noted above.

In FIG. 10 is shown a first set of lug nuts, in a first circular pattern spacing, operatively engaged with a first set of lug wells 23 extending from the body 11 to distal ends of the lug wells 23. As noted above, in FIG. 11 can be seen a second set of spaced lug wells 23, adapted for engagement upon a second set of lug nuts having projecting shoulders 33, positioned for a registered engagement with the notches 31 in the lug wall 21 at the distal ends of the lug wells 23. This second set of lug wells 23 is spaced and adapted for engagement to the lugs with engaged long nuts 35, which project in a pattern through the wheel being attached, with the notches 31 providing a recess for the annular shoulder 33 and thereby allowing the inner edge 13 and the outer edge 14 to seal against the wheel when the device 10 is in an as-used position engaged with a wheel having lug nuts 35 having rotating annular shoulders 33 engaged at the proximal end which have a circumference larger than the circumference 41 extending around the lug nut 35 as shown in FIG. 14.

As shown in the depictions of FIGS. 9-11 the device can be configured with pairs of lug wells having a common wall area, with each pair having one lug well from the first set of lug wells 23 and another set of lug wells 23 configured for an engagement with a second type of lug nut. This mode is adapted to engage half of the conventional ten lug nuts on a large truck wheel, and provides a solid engagement of the device 10 without having to cover all of the lug nuts with lug wells 23. Further, is adapted for engagement to two types of lug nuts 35 in the same device 10. Of course a different number of pairs of lug wells 23 may be employed where a wheel has a different aggregate number of lug nuts holding it on, but it is preferred always to maintain the balance of the device 10 by the equidistant radial spacing of the total number of individual or pairs of lug wells 23 around the perimeter, to thereby maintain the wheel balance when the device is engaged.

As shown in FIGS. 10 and 12, lug nuts 35 are typical of those employed for mounting a lug-piloted wheel well know in the art. The tapered 37 mating surface on such lug nuts 35 is adapted to engage a cooperatively tapered surface on the wheel. Shown in FIGS. 11 and 13 is a second widely employed type of lug nut 35 employed to mount a hub-piloted wheel and provides a rotationally engaged annular shoulder 33, attached at the proximal end of the lug nut 35. This shoulder 33 projects past the diameter or circumference 41 of the lug nut 35, and provides a larger surface to mate with the wheel surface and rotates on the lug nut 35 and prevents the proximal end of the lug nut 35 from wearing on the wheel surface. As noted, the notches 31 are positioned to accommodate the circumferential edge of the annular shoulder 33 which projects past the circumference 41 of a lug nut 35.

While all of the fundamental characteristics and features of the disclosed lug nut wheel covers have been shown and described, a latitude of modification, various changes and substitutions are intended in the foregoing disclosure. It will be apparent that in some instance, some features of the invention may be employed without a corresponding use of other features, or steps may be rearranged for operations, without departing from the scope of the invention as set forth. It should be understood that any such substitutions, modifications, and variations, may be made by those skilled in the art, without departing from the spirit or scope of the invention. Consequently, all such modifications and variations are included within the scope of the invention as defined herein.

I claim:

1. A wheel lug ring, comprising:

an annular body;

said body having a first side, said first side having an circular inner edge and a circular outer edge;

a cavity formed on said first side of said body defined by a first surface extending between said inner edge and said outer edge;

said body having an outer surface defined by a second surface of said body opposite said first surface, said second surface extending between said inner edge and said outer edge;

a first plurality of lug wells positioned in said cavity;

each of said lug wells being spaced around said cavity to respective positions adapted to register in positioning with a respective one of a first plurality of lug nuts which engage against a surface of a wheel on lugs to hold said wheel to an axle;

each of said first plurality of lug wells having a diameter defining a first gap between opposing portions of a sidewall surface defining said lug well;

said first gap sized to cause a frictional engagement of said sidewall surface of a respective one of said first set of lug wells, upon a circumference of a respective one of said first set of lug nuts;

said lug ring engageable to an as-used position with each of said lug wells in said first set of lug wells frictionally engaged with a respective one of said lug nuts in said first set of lug nuts engaged with a lug to hold a surface of a wheel, thereby positioning each of said lug nuts from said first set of lug nuts adapted to engage herewith, within a respective said lug well and concurrently within said cavity;

a second plurality of lug wells positioned in said cavity;

each of said lug wells in said second plurality of lug wells being spaced around said cavity to respective positions configured to register in positioning with a respective one of a second set of lug nuts employed for engaging a surface of a said wheel on lugs to hold said wheel to a said axle;

each of said second plurality of lug wells, having a diameter defining a second gap between opposing portions of a sidewall surface defining each of said lug wells in said second plurality of lug wells; and said first gap being different than said second gap, whereby said lug ring is engageable to said as-used position, on a said wheel having a first set of said lug nuts to which said first plurality of lug wells is adapted to frictionally engage, or, on a said wheel having a second set of said lug nuts to which said second plurality of said lug wells is adapted to frictionally engage.

2. A wheel lug ring, comprising:

an annular body;

said body having a first side, said first side having an circular inner edge and a circular outer edge;

a cavity formed on said first side of said body defined by a first surface extending between said inner edge and said outer edge;

said body having an outer surface defined by a second surface of said body opposite said first surface, said second surface extending between said inner edge and said outer edge;

a first plurality of lug wells positioned in said cavity;

each of said first plurality of lug wells being spaced around said cavity to respective positions adapted to register in positioning with a respective one of a first plurality of lug nuts which engage against a surface of a wheel on lugs to hold said wheel to an axle;

each of said first plurality of lug wells having a diameter defining a first gap between opposing portions of a sidewall surface defining said lug well;

said first gap sized to cause a frictional engagement of said sidewall surface of a respective one of said first set of lug wells, upon a circumference of a respective one of said first set of lug nuts;

a second plurality of lug wells positioned in said cavity;

each of said lug wells in said second plurality of lug wells being spaced around said cavity to respective positions configured to register in positioning with a respective one of a second set of lug nuts employed for engaging a surface of a said wheel on lugs to hold said wheel;

each of said second plurality of lug wells, having a diameter defining a second gap between opposing portions of a sidewall surface defining each said second lug well; and said first gap being different than said second gap, whereby said lug ring is engageable to an as-used position, on a said wheel having a first set of said lug nuts to which said first plurality of lug wells is adapted to frictionally engage, or, on a said wheel having a second set of said lug nuts to which said second plurality of said lug wells is adapted to frictionally engage; and said inner edge and said outer edge both forming a separate contact against said surface of said wheel thereby forming a seal of both said inner edge and said outer edge against said surface of said wheel, with said lug ring is in said as-used position whereby said first plurality of lug wells and said second plurality of lug wells are in a sealed positioning within said cavity surrounded by said surface of said wheel and said first surface of said body, said sealed positioning providing means for preventing communication of moisture, mud, ice, thereto.

3. The wheel lug ring of claim 1, additionally comprising:

each one of said first plurality of lug wells being positioned within said cavity in a respective pair with a respective one of said second plurality of lug wells.

4. The wheel lug ring of claim 2, additionally comprising:

each one of said first plurality of lug wells being positioned within said cavity in a respective pair with a respective one of said second plurality of lug wells.

5. The wheel lug ring of claim 3, additionally comprising:

said second plurality of lug wells formed of elastic material;

said second gap being equal less than a circumference around the outside of each of said second set of lug nuts;

and said frictional engagement being a compressively biased frictional engagement of each respective one of said second plurality of lug wells to a respective one of said second plurality of lug nuts.

6. The wheel lug ring of claim 4, additionally comprising:

said second plurality of lug wells formed of elastic material;

said second gap being equal less than a circumference around the outside of each of said second set of lug nuts;

and said frictional engagement being a compressively biased frictional engagement of each respective one of said second plurality of lug wells to a respective one of said second plurality of lug nuts.

* * * * *